350-376 SR

XR 3,643,233

United States Patent

Fan et al.

[15] 3,643,233

[45] Feb. 15, 1972

[54] THREE-DIMENSIONAL OPTICAL READ-ONLY MEMORY

[72] Inventors: George J. Fan, San Jose, Calif.; James H. Greiner, Millwood, N.Y.

[73] Assignee: International Business Machines Corporation, Armonk, N.Y.

[22] Filed: Jan. 15, 1969

[21] Appl. No.: 791,319

[52] U.S. Cl. ................340/173.2, 340/146.3, 340/173 LM, 340/173 LSS, 340/174.1 M, 340/174 TF, 340/174 YC, 350/151

[51] Int. Cl. ...............................G11c 11/22, G11c 11/42

[58] Field of Search.............340/173 LM, 174.1 MO, 146.3, 340/173 LS; 350/160, 151, 159

[56] References Cited

UNITED STATES PATENTS

| | | | |
|---|---|---|---|
| 2,928,075 | 3/1960 | Anderson | 340/173.2 |
| 2,960,914 | 11/1960 | Rogers | 340/174.1 MO |
| 2,984,825 | 5/1961 | Fuller | 340/174.1 MO |
| 3,215,989 | 11/1965 | Ketchledge | 340/173 |
| 3,443,857 | 5/1969 | Warter | 350/160 |

*Primary Examiner*—Terrell W. Fears
*Attorney*—Hanifin and Jancin and George Baron

[57] ABSTRACT

A three-dimensional optical read-only memory is composed of a stack of transparent plates composed of either ferroelectric or ferromagnetic materials wherein binary information is stored as domains in each plate. The stack of plates containing the domains allows a polarized source of light to traverse the stack and appear, to a detecting device, as a homogeneous source. When an electromagnetic field is applied across a single plate in the stack, the polarization of the domains in that plate is rotated, creating a birefringence in the material. The polarized source of light is now modulated by such particularly selected plate according to this particular bit pattern of domains. This pattern can be imaged onto an array of detectors. When the electromagnetic field is removed, the disturbed domains return to their original storage states so that the polarized interrogating light reappears as a homogeneous source to all detectors.

6 Claims, 7 Drawing Figures

3643233
OR IN 3657122

INVENTORS
GEORGE J. FAN
JAMES H. GREINER

BY [signature]
ATTORNEY

THREE-DIMENSIONAL OPTICAL READ-ONLY MEMORY

BACKGROUND OF THE INVENTION

In conventional optical memories, storage of information is normally planar. That is, binary information is stored in a single memory plane of material and the stored information is sensed by sending an interrogating polarized beam through the memory plane whereby the interrogating beam is modulated by the nature of the storage. Systems for sensing such modulated light are well known and such patents as Anderson Patent No. 2,928,075 which issued Mar. 8, 1960 and Alexander et al. Patent No. 3,104,377 which issued Sept. 17, 1963 are examples of such planar-type memories.

Individual memory planes are obviously limited in their capacity to store information. It would be most desirable to be able to stack as many as 100 memory planes, one atop of the other, to increase the capacity of the memory. The interrogating polarized light is made to pass through the entire stack. The storage of "1's" and "0's" are in the form of antiparallel domains, that is, the storage of a binary "1" comprises a polarization or domain wall that is 180° to that of a storage of a binary "0". Such binary states are not distinguishable from one another because the interrogating light is not modulated by such 180°-oriented domain walls. All the memory planes appear homogeneous regardless of polarized light normal to the stack. However, if an electromagnetic field or stress is applied perpendicular to the polar axis, and is chosen to exert opposite torques on the antiparallel domains such as to disturb, but not rotate, the polarization, then the antiparallel domains become distinguishable. Thus each memory plane in the stack will comprise a ferroelectric crystal capable of supporting antiparallel domain walls. Associated with each such memory plane will be a pair of electrodes to which an electrical potential can be selectively supplied for singling out a plane to be interrogated. During the quiescent state of the memory stack, the interrogating polarized light, save for the reflection and absorption characteristics of the ferroelectric crystal chosen, will be transmitted undisturbed through the stack. When a given memory plate in that stack is to be selected, an electric field is applied perpendicular to the polar axis of that memory plate, causing a disturbance of the domain wall storing a "1" that is different from the disturbance of the domain wall storing a "0." Such difference is sensed by an optical sensing means. In effect, all the bits of a single memory plate can be read out in parallel.

The inventive concept described above can also be applied to a stack of memory planes wherein binary storage is accomplished by employing antiferromagnetic ordering. Antiferromagnetic domains having different ordering directions can appear homogeneous to an interrogating light beam in the unperturbed state. A stress or magnetic field favoring one domain at the expense of the other would allow the domains to be distinguishable.

Thus, it is an object of this invention to attain optical readout of a three-dimensional memory storage.

It is yet another object to achieve optical readout of a three-dimensional memory wherein the interrogating light passes homogeneously through the memory during the quiescent state of the memory.

A further object is to allow for the operation of the memory stack even while some of the plates composing the memory have been removed from the stack.

The foregoing and other objects, features and advantages of the invention will be apparent from the following more particular description of a preferred embodiment of the invention, as illustrated in the accompanying drawings.

DESCRIPTION OF THE DRAWINGS

FIG. 2, composed of FIGS. 2A and 2B, is a schematic showing of storage of a binary bit in the form of antiparallel domains in a ferroelectric planar surface.

In FIG. 1 is shown the three-dimensional memory comprising a stack 2 of memory planes 4, each of which is composed of a single flat crystal 6 of barium titanate ($BaTiO_3$) and a pair of electrodes 8 and 10 deposited on two opposite edges of each crystal 6. Such electrodes 8 and 10 can be very thin films of conductive metal such as gold, platinum, copper, etc., that are plated, vapor-deposited or otherwise made adherent to the crystal 6. The electrode configuration need not be as shown in the drawings. The electrodes are shaped so the potentials applied to such electrodes 8 and 10 produce a uniform electric field over its corresponding memory plane 4. Electrodes 8 and 10 have suitable leads 12 and 14 applied to them so that voltage pulses from pulse generator 16 can be applied at will through switch 18 to its associated crystal 6. Each crystal can be selectively actuated and the switches 18 are only symbolic of a switching network capable of making such selection.

Figures 1, 2A, 2B, 3:
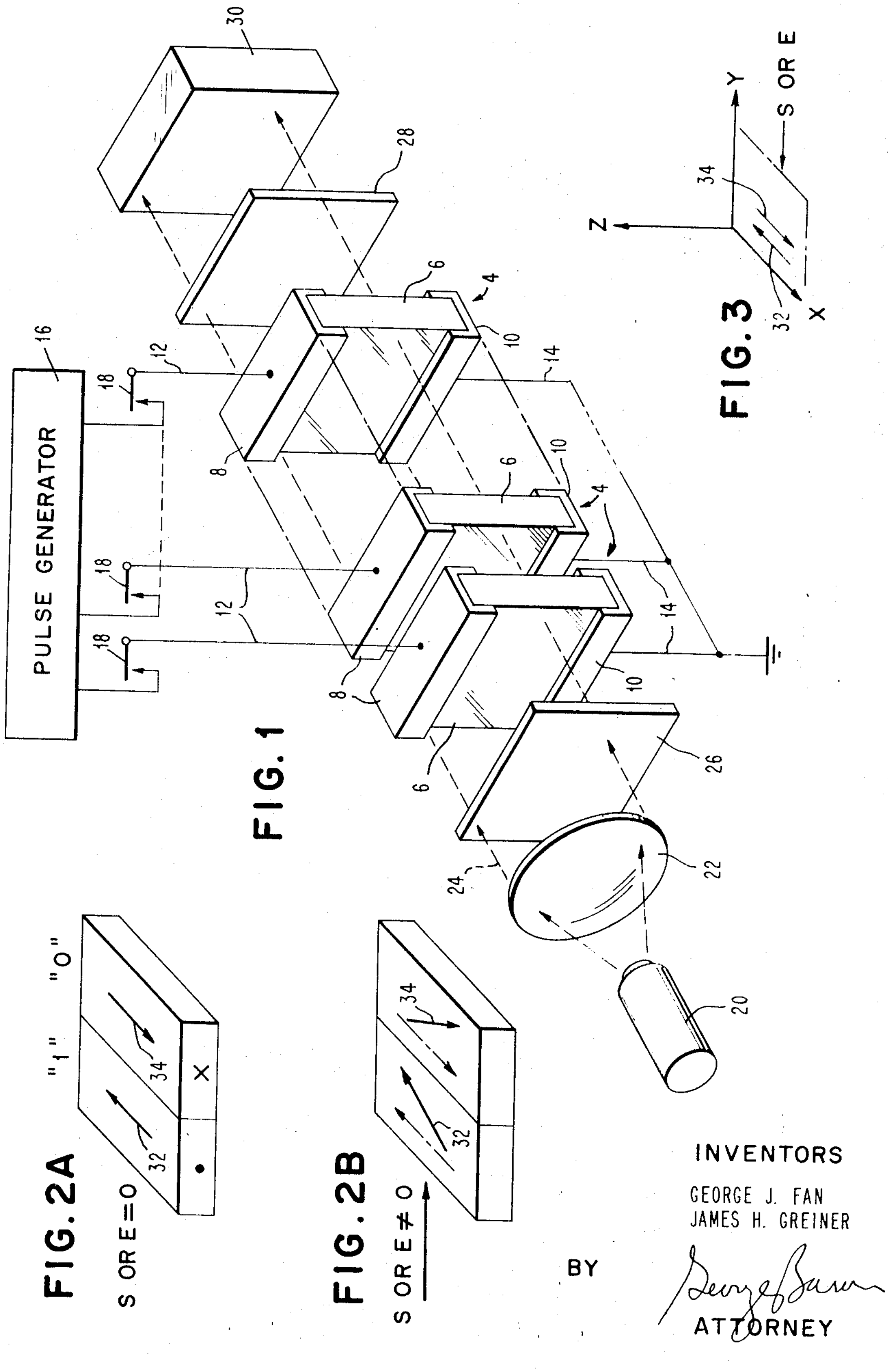
FIG. 1 is a schematic showing of the overall three-dimensional memory.
FIG. 3 is a diagram showing the relationships between polar axes and electric fields applied to domains with respect to those polar axes.

A source of coherent polarized light 20, such as a laser, is sent through a lens 22 to provide a parallel beam 24 of light. Such beam 24 is sent through a polarizer 26 and then passes through the entire stack of memory planes 4. At the exit of the stack 2 is an analyzer 28 and a detector 30. Detector 30 is an array of photodiodes, one diode for each memory bit location in a memory plane 4. The sensing area of each photodiode as well as the spacing between photodiodes are chosen consistent with the width of a domain in a $BaTiO_3$ crystal. The plate thickness of crystal 6 can vary from 0.00001 cm. to 0.01 cm. and for a plate thickness of 0.001 cm. to 0.1 cm., individual domains in the $BaTiO_3$ are of the order of $10^{-4}$ cm. The very thin storage material making up an individual memory plane can be supported, where needed, on a substrate.

Each of the crystals 6 are made to have an area of the order of 1 $cm.^2$ and can be affixed to the memory stack 2 by suitable locating pins, channels, etc., (not shown) that are well known in the field of electronic microminiaturization and form no part of the present invention. Each such crystal 6 can have binary data written into so that such data is represented as antiparallel domains, a first domain representing the storage of a binary "1" and that domain which is 180° from said first domain representing a binary "0". The manner in which such antiparallel domains is written forms no part of the present invention, but an acceptable technique for achieving such antiparallel domains is set forth in an article entitled "A Proposed Beam-Addressable Memory" by C. D. Mee and G. J. Fan that appeared in the IEEE Transactions on Magnetics, Vol. MAG 3—No. 1, Mar. 1967, pp. 72-76.

Figs. 2 and 3 are now considered in order to better understand how an interrogating polarized beam is made to appear homogeneous to an array of detectors 30 during the quiescent state (when no electric field is applied to a crystal 6) and how the antiparallel domains are made distinguishable when an electric field is applied to a crystal.

FIG. 2A shows two adjacent domains wherein the polar axis, represented by arrows 32 and 34, of each domain lies within the plane of the crystal 6. It is assumed, as seen in FIG. 3, that the X-Y plane of the crystal 6 is the storage plane and binary storage is parallel to the X-axis. Such domains are called "*a*" domains and lie in the plane of the crystal. A domain such as that which has a polar axis 32 directed toward the Y-axis represents the storage of a binary "1" whereas that domain 34 whose polar axis is directed away from the Y-axis is representative of the storage of a "0". The polarizing light which is used to interrogate the storage state of a memory plane 4 is directed parallel to the Z-axis and perpendicular to all the memory planes in the stack 2.

If an electric field E or a mechanical stress is applied in the plane of the crystal 6 so that such field or stress is perpendicular to the *a*-domains, the polar axes of the domains are disturbed, with the head of each arrow 32 and 34 rotating in the direction of the applied field or stress. The applied field, assuming for our discussion that an electric field and not a stress is employed, is chosen to be of sufficient strength to move the polar axis through an angle, but not to rotate the axis so that it switches to a state other than its original state. When polarized light is directed along the Z-axis through the memory stack disposed between crossed polarizers, the antiparallel domains will have the same extinction. Thus, regardless of the storage state of the binary bits in each plane of the stack 2, the individual photodiodes in the detector do not distinguish a "1" from a "0". However, when an electric field E is applied along the Y-axis, the extinction positions for the antiparallel domains are different and such difference is sensed by the photodiodes of detector 30.

Figure 4:
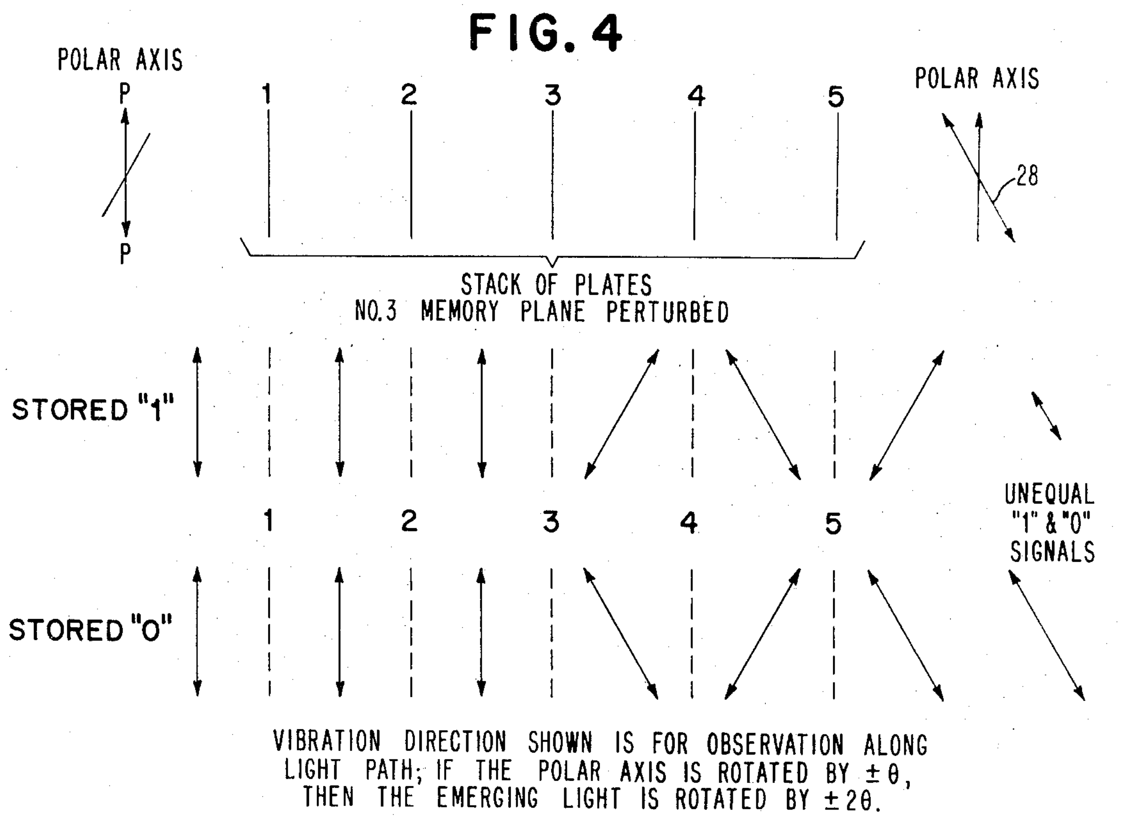
FIG. 4 is a schematic showing of the operation of the readout scheme for a three-dimensional memory using ferroelectric storage plates.

How such distinction is made is better seen by considering FIG. 4. Assuming that the beam 24 of light of FIG. 1 is made to pass through polarizer 26 so that the axis of the polarizer and the polar axis of every binary bit for each memory plane 4 are parallel. The linear polarized light beam 24 is transmitted undisturbed, save for the usual reflection and absorption losses, through the stack 2 of memory planes. The crossed analyzer 28 will show equal diminution of the interrogating light beam 24 and the detector 30 will not be able to distinguish between a "1" or a "0" signal.

Assume that a memory plane 4 is perturbed by applying a voltage pulse across its associated electrodes 8 and 10 so that the momentary electric field perturbs the respective domains of that memory plane. When a single memory plane is disturbed, the nature of the light emerging from disturbed plane of birefringent material depends on a. the orientation of the polar axis with respect to the plane of polarization and
b. the optical path difference between the light vibrations parallel and perpendicular to the polar axis.

In general, the light emerging from the perturbed plate will be elliptically polarized with the ellipse rotated in the direction of the polar axis. The light incident on the analyzer 28 will be elliptically polarized and dependent upon the path difference in the plates succeeding the perturbed plate. If the thickness of each of the plates 6 is such that the phase difference between a vibration component parallel to the polar axis is equal to $p\lambda/2$, where $p$ is an odd whole number and $\lambda$ is the wavelength of the polarized light, then the light emerging from each plate is linearly polarized. That is, by choosing the proper thickness of ferroelectric material, the velocity of the horizontal component and vertical component of polarized light through the material can be made effectively equal to exit as linearly polarized light.

Figure 5A:
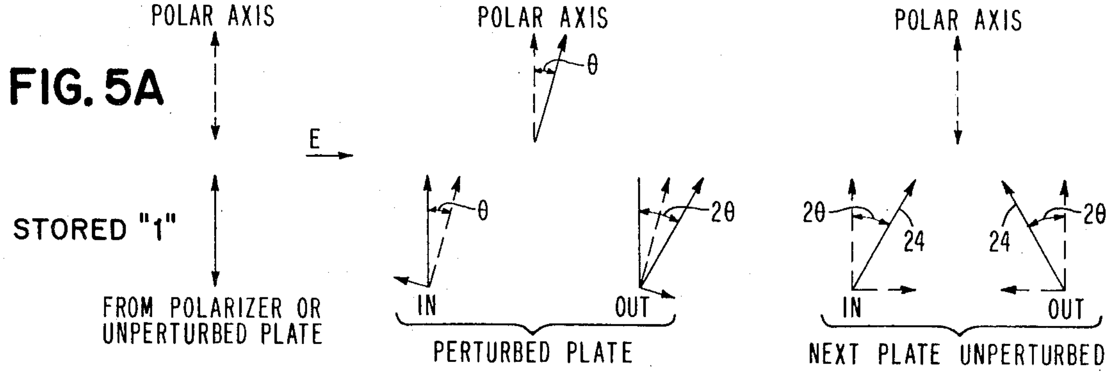
FIG. 5 is a showing of the manner in which linear polarized light passes through a memory stack when a single plane is interrogated.
Figure 5B:
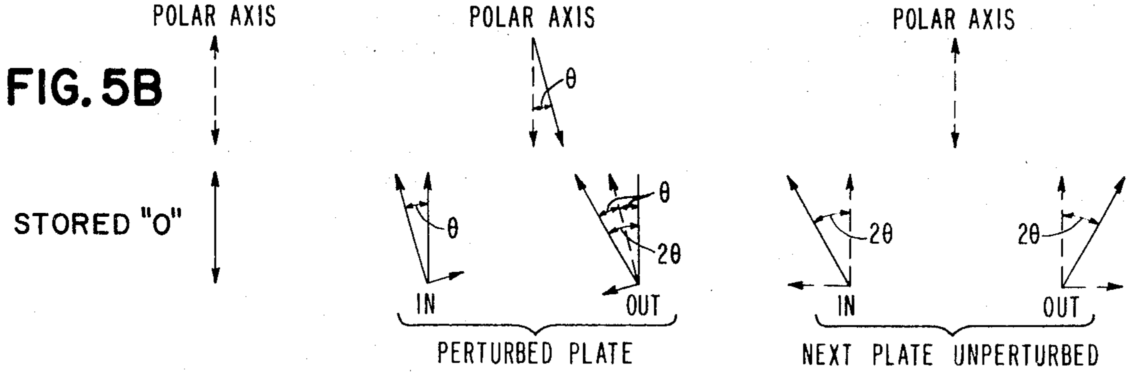

FIG. 5 is a diagrammatic representation of the effect of subsequent unperturbed memory planes 4 on the polarized light emerging from a disturbed memory plane and is, in effect, a more detailed discussion of what transpires during readout of the optical memory. In the discussion that follows, the interaction of a linearly polarized light with a ferroelectric material such as $BaTiO_3$ where antiparallel domains represent binary storage is equivalent to an uniaxial crystal cut parallel to its optic axis. The polar axis is parallel to this optic axis. In FIG. 5, the view of the interrogating light beam 24 is perpendicular to the storage plane and appears as a linearly polarized beam after passing through an undisturbed memory plane.

Assume that there are five memory planes in the stack 2 and that the third memory plane 4 is disturbed by application of an electrical field E at right angles to the polar axis. A stored "1" will have its polar axis rotated through an angle $\theta$ and a stored "0" will have its polar axis also rotated through the same angle $\theta$, the direction of rotations being shown respectively in FIGS. 5A and 5B. The original polarized beam 24, upon entering a disturbed plane 4 having a "1" stored therein will have its plane of polarization rotated through angle $\theta$ so that the rotated polarized beam now has a component parallel to the polar axis and one component perpendicular to the polar axis. When the polarized beam 24 leaves the disturbed memory plane, because of the proper choice of thickness of such memory plane, the plane of polarization is rotated through an additional angle $\theta$, so that the original plane of polarization is rotated clockwise through an angle of $2\theta$ for a disturbed plane 4 storing a binary "1", whereas the original plane of polarization is rotated counterclockwise through an angle $2\theta$ for a disturbed plane storing a binary "0". As the rotated plane of polarization traverses adjacent undisturbed memory planes, the displaced beam 24 switches at an angle $2\theta$ with respect to the polar axis.

As seen in FIG. 4, the analyzer 28 is placed at an angle of $2\theta$, rotated counterclockwise with respect to the polar axis so that the analyzer can distinguish between a stored "1" and a stored "0." One difficulty is encountered with the present scheme in that, after a memory plane 4 has been perturbed, the undisturbed memory planes alternately switch the rotated plane of polarization counterclockwise and clockwise for a stored "1", but counterclockwise and clockwise for a "0". Consequently, assuming 10 (or any even numbered) memory planes 4 in a stack, if an even numbered plane is perturbed, then a stored "1" is sensed at detector 30 as a counterclockwise rotation of the plane of polarization and a stored "0" is sensed as a clockwise rotation. If an odd-numbered memory plane 4 is disturbed, then a stored "1" is sensed at detector 30 as a clockwise rotation and a stored "0" as a counterclockwise rotation of the plane of polarization of beam 24. This difficulty can be overcome by supplying a "bookkeeping" function to the memory address portion of the memory so that the selection of an odd-numbered memory plane 4 in a stack will condition the detector 30 to indicate whether the light transmitted by the analyzer 28 is to be interpreted as a "1" or a "0". Such schemes are not shown in that they do not form a part of the invention, per se, being described and claimed herein.

If desired, the memory planes 4 can be composed of a magneto-optical material, such as europium oxide, wherein binary data are represented by stored magnetic domains and the disturb field would be a magnetic field applied to a memory plane, instead of an electric field, to achieve the modulation of an interrogating beam of polarized light.

Antiparallel ferroelectric domains may also be stored perpendicular to the storage plane 4, i.e., a *c*-domain plate. These antiparallel domains would appear homogeneous in the unperturbed state to an interrogating light beam 24. The application of an electric field or a stress to one storage plate in a stack of storage plates would allow the antiparallel domains on the perturbed plate to be distinguishable at the detector 30. The perturbing electric field or stress can be applied such that opposite torques are exerted on the antiparallel domains or applied to rotate only one of the antiparallel domains, for example, an electric field applied perpendicular to a memory plane 4 by transparent, noninteracting electrodes on such memory plane 4. In any case, reading is nondestructive since the perturbed field is not large enough to permanently rotate the polarization.

Thus it is seen how large-capacity optical memories can be built employing the teaching of this invention. A memory plane 4, 1 $cm.^2$ and of the order of 0.01 cm. thick, can store domains that are each about a few microns in width, permitting $10^6$ bits of information to be stored on one plane. If a hundred of such ferroelectric plates 6 are stacked, then $10^8$ bits of information can be stored in a volume of only 1 cc. wherein only a hundred pairs of leads, such as leads 12 and 14, are needed for selectively reading out any plane in that stack.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A three-dimensional optical memory comprising an optically serial stack of individual transparent memory planes, each of said memory planes being aligned along a single central axis, each plane comprising a plurality of domains and antiparallel domains representative of binary storage, wherein said domains and antiparallel domains represent binary storage of ones and zeros having a 180° phase relationship with each other in the quiescent state, means for sending a linearly polarized light beam through the entire area of each of said memory planes of said stack during the quiescent state of said memory whereby each linearly polarized light beam is modulated equally by said domains and antiparallel domains, and means for disturbing the phase relationship of all the domains of only a single memory plane whereby the optical properties of such domains are modified, causing a different modulation of said polarized light beam and means for detecting said different modulation of the polarized beam transmitted through the stack.

2. The three-dimensional optical memory of claim 1 wherein said memory planes consist of a ferroelectric material and wherein said means for disturbing the domains of a memory plane is an applied electric field selectively applied to a single one of said memory planes.

3. The three-dimensional optical memory of claim 1 wherein said memory planes consist of a magnetic material and wherein said means for disturbing the domains of a memory plane is an applied magnetic field selectively applied to a single one of said memory planes.

4. A three-dimensional optical memory comprising an optically serial stack of individual transparent memory planes, each of said memory planes being aligned along a single central axis, each plane comprising a ferroelectric plate storing domains and antiparallel domains representative of binary information manifesting binary ones and zeros having a 180° phase relationship in the quiescent state, means for sending a linearly polarized light beam through said stack during the quiescent state of said memory whereby such linearly polarized light beam is modulated equally by said domains and antiparallel domains, and means for applying an electric field perpendicular to said domains and antiparallel domains of a selected single memory plane so as to disturb the phase relationship but not switch said domains and antiparallel domains, whereby said polarization light beam is modulated according to the binary pattern of the selected memory plane, and means for sensing the modulated polarized light after its passage through the memory stack.

5. A three-dimensional optical memory comprising an optically serial stack of individual transparent memory planes, each of said memory planes being aligned along a single central axis, each plane comprising a ferroelectric plate storing domains and antiparallel domains representative of binary information manifesting binary ones and zeros having a 180° phase relationship in the quiescent state, means for sending a linearly polarized light beam through said stack during the quiescent state of said memory whereby such linearly polarized light beam is modulated equally by said domains and antiparallel domains, means for applying an electric field perpendicular to said domains and antiparallel domains of a selected single memory plane so as to disturb but not switch the phase relationship of said domains, whereby said polarized beam is modulated according to the binary pattern of the selected memory plane, and said ferroelectric plates being chosen to have a thickness equal to a given number of half-wave lengths of the linearly polarized light beam to maintain said beam linearly polarized throughout its passage through the memory stack.

6. The three-dimensional optical memory of claim 1 wherein said memory planes consist of an antiferromagnetic material.

* * * * *